C. ROGERS & G. T. PARKER.
LAMP FOR ROAD VEHICLES.
APPLICATION FILED FEB. 3, 1909.
929,711.
Patented Aug. 3, 1909.
2 SHEETS—SHEET 1.
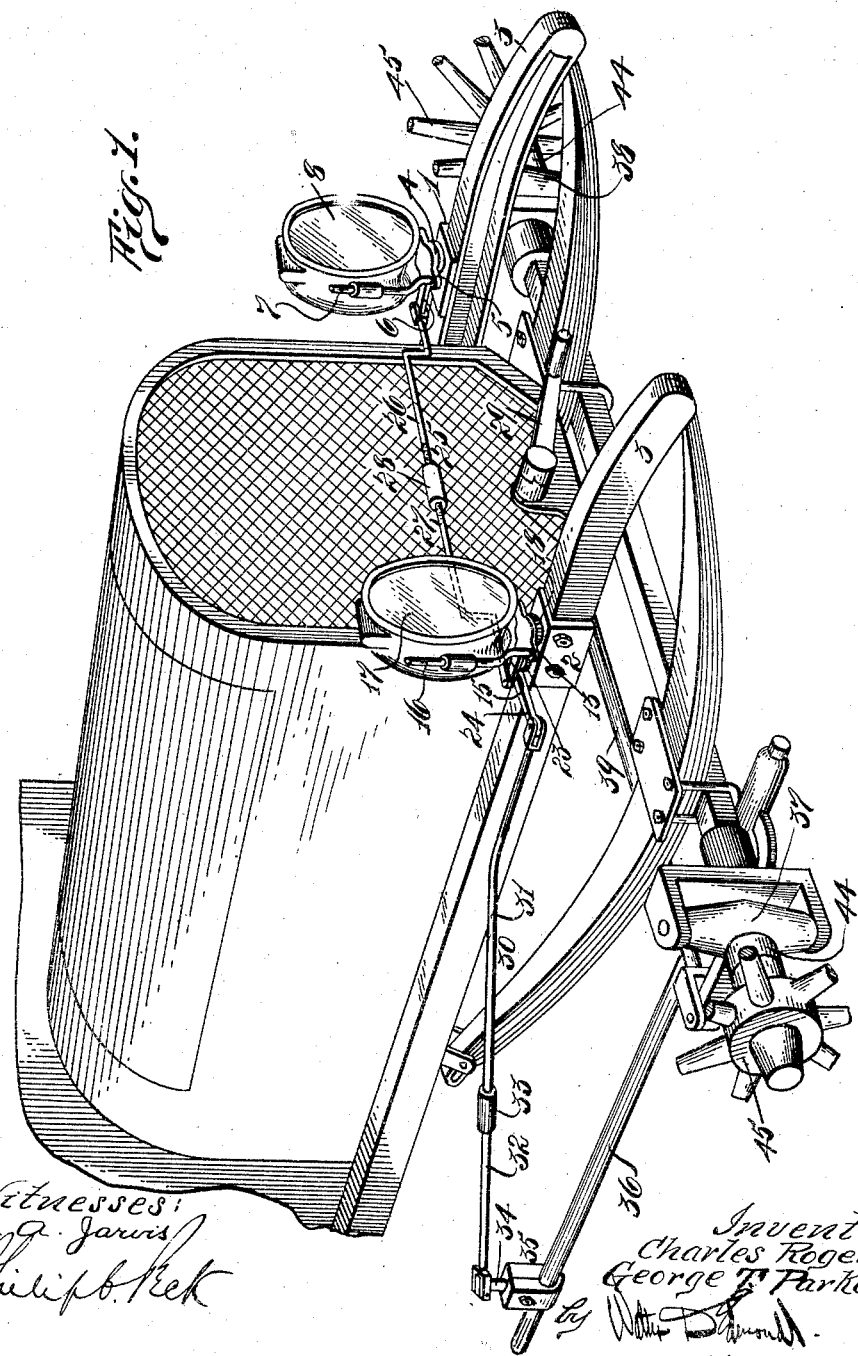

C. ROGERS & G. T. PARKER.
LAMP FOR ROAD VEHICLES.
APPLICATION FILED FEB. 3, 1909.
929,711.
Patented Aug. 3, 1909.
2 SHEETS—SHEET 2.
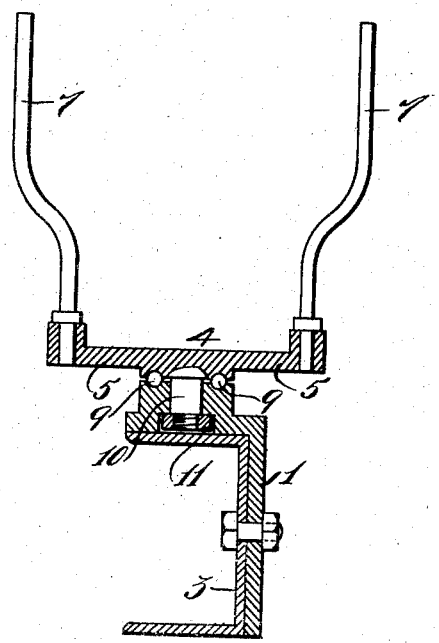
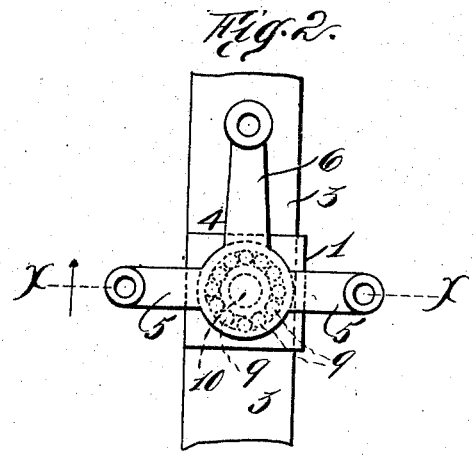
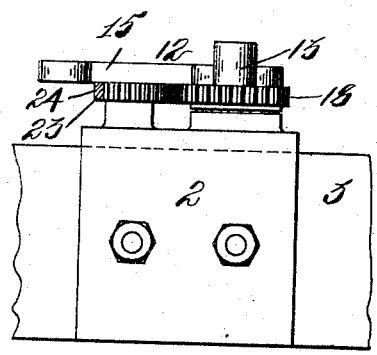
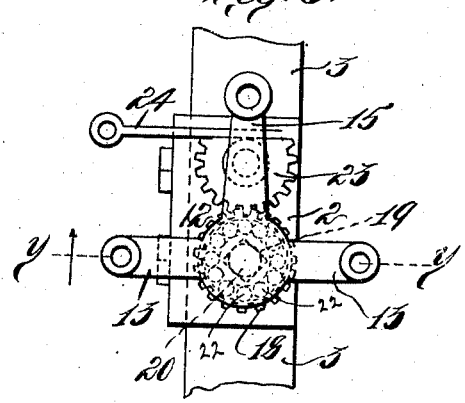
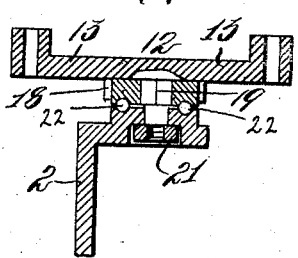
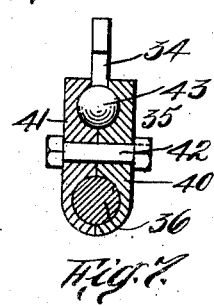
Witnesses
E. A. Jarvis
Philip B. Peck
Inventors
Charles Rogers
George T. Parker
by Walter B. Emrich
Attorney

UNITED STATES PATENT OFFICE.

CHARLES ROGERS AND GEORGE T. PARKER, OF ORANGE, NEW JERSEY; SAID PARKER ASSIGNOR TO SAID ROGERS.

LAMP FOR ROAD-VEHICLES.

No. 929,711. Specification of Letters Patent. Patented Aug. 3, 1909.

Application filed February 3, 1909. Serial No. 475,767.

*To all whom it may concern:*

Be it known that we, CHARLES ROGERS and GEORGE T. PARKER, both citizens of the United States, and residents of Orange, in the county of Essex, in the State of New Jersey, have jointly invented certain new and useful Improvements in Lamps for Road-Vehicles, of which the following is a specification.

The principal object of our invention is to increase at night certainty of guidance and security of progression in road vehicles equipped with lamps supported and disposed to project light in advance in the direction of progression of the vehicle.

Road vehicles have been heretofore generally provided with lamps on either side intended to afford the light required, but these lamps, being rigidly connected with the body of the vehicle or parts therewith connected, are, in the ordinary reflector form employed, incapable of projecting light except in directions substantially parallel with the central longitudinal axis of said body. Change in the direction of progression of such vehicles is usually effected by oscillating or moving the axles, upon which the bearing wheels rotate, relatively to said central longitudinal axis, the result of which is that in making turns the light is not projected in the direction of progression, but at an angle thereto, thus preventing the driver from as clearly seeing as is desirable for the time being the ground and other objects in the exact direction of progression on the curve. We obviate these objections, and attain the objects stated, by means of our invention, which consists, in its broadest aspect, in constructing and supporting the lamps movably relatively to the body member of the vehicle, and providing them with means whereby the said lamps are automatically caused to turn or swing in unison with each other and with said movement of the axles relatively to the body of the vehicle in rounding curves and the like.

In understanding our invention, there is to be considered, as one group, the said body member of the vehicle embracing the car and all elements therewith rigidly connected so as to necessarily move in unison with said body, and, as another group, the running gear and its connections including the bearing wheels, their axles, and other connections likewise so connected together as to be movable in unison with each other relatively to the former group comprising the body and its connections.

To illustrate our invention and enable others to practice it we will now describe the preferred form and combination of devices whereby we have successfully applied it, it being understood that we do not confine ourselves to the particular means so described.

Referring now to the accompanying drawings, Figure 1 is a perspective view of part of the forward part of a road vehicle, in this instance an automobile, and showing one form and arrangement of devices adapted to embody our invention. Fig. 2 is an enlarged detail top plan view of the left hand lamp bracket. Fig. 3 is a similar enlarged detail top plan view of the right hand lamp bracket. Fig. 4 is an enlarged cross sectional view taken on the line $x$—$x$ shown in Fig. 2, and shows the lamp supporting rods in position. Fig. 5 is a side elevation of the left hand bracket, looking from the left in Fig. 3. Fig. 6 is a cross sectional view taken on the line $y$—$y$ of Fig. 3. Fig. 7 is an enlarged vertical sectional view of the ball and socket connection for the lamp turning device.

Referring to the figures, we illustrate in Fig. 1, by 1 and 2, lamp brackets secured to the frame members 3 of the machine. The bracket 1 has mounted pivotally thereon a swivel frame 4, consisting of the bracket arms 5 and the lever arm 6, the arms 5 being adapted to support removably in this instance the rods 7 (see Figs. 2 and 4) which in turn are adapted to support a common form of head or reflector lamps for automobiles 8 (see Fig. 1).

In order that the swivel frame 4 may be turned easily, we interpose between the said frame 4 and the bracket 1 (see Fig. 4) balls 9, 9, which constitute a ball bearing of the ordinary form of construction, the swivel frame 4 being provided with a spindle 10, which is pivotally secured in the bracket 1 by a nut 11, as shown in Fig. 4. Likewise the bracket 2 pivotally supports a swivel frame 12, which consists of the bracket arms 13 and lever arm 15. The arms 13 are adapted to support the lamp supporting rods 16 which in turn support and secure a head reflector lamp 17 as shown in Fig. 1.

In order that the frames 4 and 12 can swing simultaneously with each other, we provide the frame 12 with a gear 18, shown in Figs. 3 and 6, which is carried by the squared portion 19 of the spindle 20 (shown in Fig. 3) the said spindle 20 being pivotally secured in the bracket 2 by the nut 21. Between the gear 18 and the bracket 2 we place balls 22, 22, which constitute the well known ball bearing support for the frame 12. To operate the gear 18 we employ an intermeshing pinion 23 which in turn is pivotally secured to the bracket 2. The pinion 23 carries a lever arm 24 which is adapted to operate said pinion.

Referring again to Fig. 1 it will be observed that the lever arms 6 and 15 are connected with each other by a rod 25, the said rod comprising two members 26 and 27, which are in turn connected with each other by a turn buckle 28, the adjacent ends within the turn buckle of the said members being threaded right and left handed respectively. By means of the said rod 25, which is offset in order to allow for the turning of the crank arm 29, the two arms 6 and 15 are caused to swing in unison and at the same angle with each other and likewise their thereto respectively connected swivel frames 4 and 12, and the lamps thereby carried.

To swing the frames 4 and 12 we have in this instance employed a connecting rod 30 shown in Fig. 1, which consists of the members 31 and 32 connected by a turn buckle 33. The forward end of the rod 30 engages the lever arm 24 of the pinion 23 while the rear end is engaged by a spindle 34, which in turn is carried by a block 35 secured to the reach rod 36 which transmits movement from the steering wheel of the vehicle or machine to the knuckle 37, which knuckle is connected to a corresponding knuckle 38 by a cross rod 39, as is well known in the construction of such devices for road vehicles. 44 represents the axle bearing of one of the forward wheels upon which the hub 45 is shown in perspective in Fig. 1.

As the reach rod 36 has, when performing its function, a compound movement in a forward and outward direction, we prefer to make the connection between the spindle 34 and the block 35 of a universal nature. In this instance the block 35 consists of the members 40 and 41 shown in Fig. 7 secured together and to the rod 36 by a bolt 42. The upper end of the members are recessed to receive the ball 43, on the end of the spindle 34. The spindle 34 is mounted for rotary movement only as is clearly shown in the figure. Other forms of universal joint connection can also be used, but we have illustrated such movement here as we have found practicable in our invention.

It will be observed that our spindle connection with the reach-rod transmits power from the latter to the lever 24 with considerable lost motion, thus reducing, as is desirable, the amount of strain imparted to the lever 24, and thereby to the lamps and their connections, thus diminishing the tendency of the lamps to oscillate in consequence of oscillations imparted to the axles by inequalities in the road.

From the foregoing description of our improved devices it is quite apparent that as the rod 36 causes the front wheels to turn, in order to guide the vehicle in any desired direction, the reflector lamps will be turned correspondingly in unison with the front wheels of the machine so as to cast their light along the roadway as has been heretofore described.

Having thus described our invention, what we claim as new and desire to secure by Letters Patent is the following, viz:—

1. In combination in a road vehicle a body member, a reach-rod supported on and movable independently of said member, a plurality of frames rotatably mounted on said body member, a lamp carried by each said frame, a lever arm secured to each said frame, a rod connecting said lever-arms, a gear connected with one of said lamps, a pinion intermeshing with said gear, a lever secured to said pinion and means to transmit power from said reach-rod to said last mentioned lever whereby said lamps are rotated in unison.

2. In combination in a road vehicle a body member, a reach-rod supported on and movable independently of said member, a plurality of frames rotatably mounted on said body member, a lamp carried by each said frame, a lever-arm secured to each said frame, a rod connecting said lever-arms, a gear connected with one of said lamps, a pinion intermeshing with said gear, a lever secured to said pinion, a rod loosely connecting said last mentioned lever with said reach-rod whereby said lamps are rotated in unison by movements of said reach-rod independent of movements of said body member.

CHARLES ROGERS.
GEORGE T. PARKER.

Witnesses:
PHILIP C. PECK,
GEORGE G. MEASURES.